United States Patent
Nishihara et al.

(10) Patent No.: US 9,118,436 B2
(45) Date of Patent: Aug. 25, 2015

(54) PON SYSTEM AND SUBCARRIER ASSIGNING METHOD

(71) Applicant: FUJITSU LIMITED, Kawasaki-shi, Kanagawa (JP)

(72) Inventors: Masato Nishihara, Kawasaki (JP); Tomoo Takahara, Kawasaki (JP); Toshiki Tanaka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 14/017,380

(22) Filed: Sep. 4, 2013

(65) Prior Publication Data

US 2014/0099111 A1    Apr. 10, 2014

(30) Foreign Application Priority Data

Oct. 5, 2012  (JP) ................. 2012-223316

(51) Int. Cl.
| | | |
|---|---|---|
| H04J 14/02 | (2006.01) | |
| H04B 10/20 | (2006.01) | |
| H04J 14/08 | (2006.01) | |
| H04B 10/073 | (2013.01) | |
| H04B 10/272 | (2013.01) | |

(52) U.S. Cl.
CPC .......... *H04J 14/0298* (2013.01); *H04B 10/073* (2013.01); *H04B 10/272* (2013.01); *H04J 14/0282* (2013.01)

(58) Field of Classification Search
CPC ............. H04B 10/073; H04B 10/071; H04B 10/0771; H04J 14/02; H04J 14/0226; H04J 14/0282

USPC .................. 398/66, 43, 162, 93, 76
See application file for complete search history.

(56) References Cited

U.S. PATENT DOCUMENTS

| | | | | |
|---|---|---|---|---|
| 5,559,624 | A | * | 9/1996 | Darcie et al. .................... 398/72 |
| 2006/0120395 | A1 | * | 6/2006 | Xing et al. .................... 370/431 |
| 2009/0092394 | A1 | | 4/2009 | Wei et al. |
| 2014/0099111 | A1 | * | 4/2014 | Nishihara et al. ............... 398/66 |

FOREIGN PATENT DOCUMENTS

| | | |
|---|---|---|
| JP | 2000-261457 | 9/2000 |
| JP | 2009-105890 | 5/2009 |

* cited by examiner

*Primary Examiner* — Oommen Jacob
(74) *Attorney, Agent, or Firm* — Fujitsu Patent Center

(57) ABSTRACT

A PON (Passive Optical Network) system, which modulates multiple subcarriers with data of multiple users to output an optical multiplexed signal from a station device, splits the optical multiplexed signal to transmit the split signals to multiple subscriber devices that are provided for each of the users, and demodulates the data of the users at the respective subscriber devices, includes: an obtaining section configured to obtain a transmission characteristic for each of the subcarriers at each of the subscriber devices, by receiving a test signal at the subscriber devices, which is transmitted from the station device; and an assigning section configured to assign one or more of the subcarriers for each of the subscriber devices suited to the transmission characteristics of the assigned subcarriers at each of the subscriber devices.

8 Claims, 11 Drawing Sheets

FIG.9A

| | SC 1 | SC 2 | SC 3 | SC 4 | ... | SC n−1 | SC n |
|---|---|---|---|---|---|---|---|
| ONU1 | b11 | b12 | b13 | b14 | | b1(n−1) | b1n |
| ONU2 | b21 | b22 | b23 | b24 | | b2(n−1) | b2n |
| ⋮ | | | | | | | |
| ONUm | bm1 | bm2 | bm3 | bm4 | | bm(n−1) | bmn |

SC NOT ASSIGNED → THE NUMBER OF BITS IS THE MAXIMUM

SC ASSIGNED TO ONUm → THE NUMBER OF BITS IS GREATER THAN OR EQUAL TO REQUIRED

FIG.9B

| | SC 1 | SC 2 | SC 3 | SC 4 | ... | SC n-1 | SC n |
|---|---|---|---|---|---|---|---|
| ONU1: | b11 | b12 | b13 | b14 | | b1(n-1) | b1n |
| ONU2: | b21 | b22 | b23 | b24 | | b2(n-1) | b2n |
| ⋮ | | | | | | | |
| ONUm: | bm1 | bm2 | bm3 | bm4 | | bm(n-1) | bmn |

SC ASSIGNED TO ONU2
→ THE NUMBER OF BITS IS GREATER THAN OR EQUAL TO REQUIRED

SC NOT ASSIGNED
→ THE NUMBER OF BITS IS THE MAXIMUM

FIG.9C

| | SC 1 | SC 2 | SC 3 | SC 4 | ... | SC n-1 | SC n |
|---|---|---|---|---|---|---|---|
| ONU1 | b11 | b12 | b13 | b14 | | b1(n-1) | b1n |
| ONU2 | b21 | b22 | b23 | b24 | | b2(n-1) | b2n |
| : | | | | | | | |
| ONUm | bm1 | bm2 | bm3 | bm4 | | bm(n-1) | bmn |

SC ASSIGNED TO ONU1
→ THE NUMBER OF BITS IS GREATER THAN OR EQUAL TO REQUIRED

SC NOT ASSIGNED
→ THE NUMBER OF BITS IS THE MAXIMUM

PON SYSTEM AND SUBCARRIER ASSIGNING METHOD

CROSS-REFERENCE TO RELATED APPLICATIONS

This application is based upon and claims the benefit of priority of the prior Japanese Priority Application No. 2012-223316 filed on Oct. 5, 2012, the entire contents of which are hereby incorporated by reference.

FIELD

The disclosures herein relate to a PON (Passive Optical Network) system and a subcarrier assigning method.

BACKGROUND

As an optical subscriber system construction technology to realize FTTH (Fiber to the Home), PON that has couplers placed in an optical fiber becomes generally popular due to a reduced fiber laying cost, which is one of its merits.

FIG. 1 is a configuration diagram of an example of a PON system. In FIG. 1, an OLT (Optical Line Terminal) 11 outputs an optical multiplexed signal in which optical signals of user data #1-#3 are modulated with time-division multiplexing. The optical multiplexed signal is split by an optical splitter 12 in three ways, each of which is transmitted to one of ONUs (Optical Network Units) 16, 17, and 18 with different-length optical fibers 13, 14, and 15, respectively.

The ONU 16 demodulates the original data #1 from the optical multiplexed signal. The ONU 17 demodulates the original data #2 from the optical multiplexed signal. The ONU 18 demodulates the original data #3 from the optical multiplexed signal.

Incidentally, a technology to multiplex subcarriers for OFDM signals with TDM (Time Division Multiplexing) is proposed (for example, refer to Patent Document 1).

Also, a technology for executing multi-rate transmission is proposed by changing the number of subcarriers for multi-carrier signals (for example, refer to Patent Document 2).

PATENT DOCUMENTS

[Patent Document 1] Japanese Laid-open Patent Publication No. 2009-105890
[Patent Document 2] Japanese Laid-open Patent Publication No. 2000-261457

In the PON system in FIG. 1, the lengths of the optical fibers 13, 14, and 15 to the ONUs 16, 17, and 18, respectively, differ with users, which make differences in fiber loss and band limiting due to dispersion and chirp among the fibers. FIG. 2 is a schematic view illustrating frequency characteristics with respect to SNR (Signal to Noise Ratio), as a transmission characteristics of the ONU 16, 17, and 18. In FIG. 2, Ia represents the transmission characteristic of the ONU 16, Ib represents the transmission characteristic of the ONU 17, and Ic represents the transmission characteristic of the ONU 18.

Thus, the transmission characteristics, or the frequency characteristics with respect to SNR, of the ONU 16, 17, and 18 are different, which imposes limits on transmittable bit rates depending on the lengths of the optical fibers 13, 14, and 15. Also, there is a problem in that spectral efficiency is reduced because only frequency bands that have satisfactory SNR values for all of the three frequency characteristics with respect to SNR (for example, 0 to 6 GHz, 14 GHz, etc.) illustrated in FIG. 2 can be used for all of the ONUs 16, 17, and 18.

SUMMARY

According to an embodiment, a PON (Passive Optical Network) system, which modulates multiple subcarriers with data of multiple users to output an optical multiplexed signal from a station device, splits the optical multiplexed signal to transmit the split signals to multiple subscriber devices that are provided for each of the users, and demodulates the data of the users at the subscriber devices, respectively, includes: an obtaining section configured to obtain a transmission characteristic for each of the subcarriers at each of the subscriber devices, by receiving a test signal at the subscriber devices, which is transmitted from the station device; and an assigning section configured to assign one or more of the subcarriers for each of the subscriber devices suited to the transmission characteristics of the subcarriers at the assigned subscriber devices.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIGS. 9A-9C are schematic view illustrating examples of a table of transmittable number of bits.

DESCRIPTION OF EMBODIMENTS

In the following, embodiments of the disclosures will be described with reference to the drawings.

Figure 1:
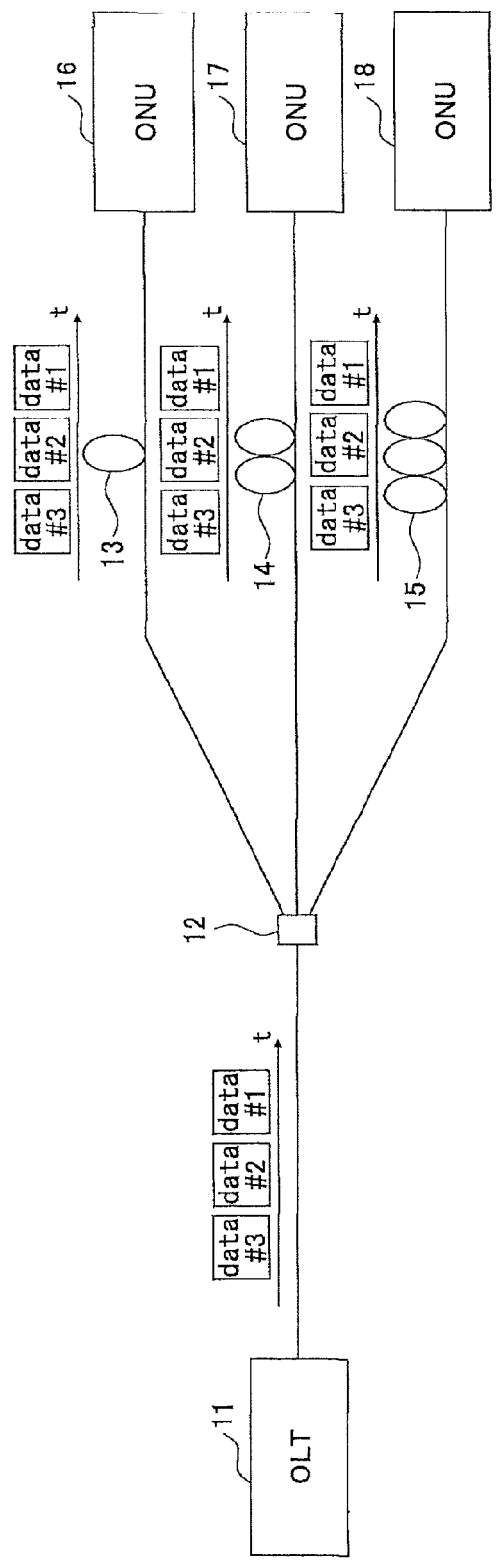
FIG. 1 is a configuration diagram of an example of a PON system.
Figure 2:
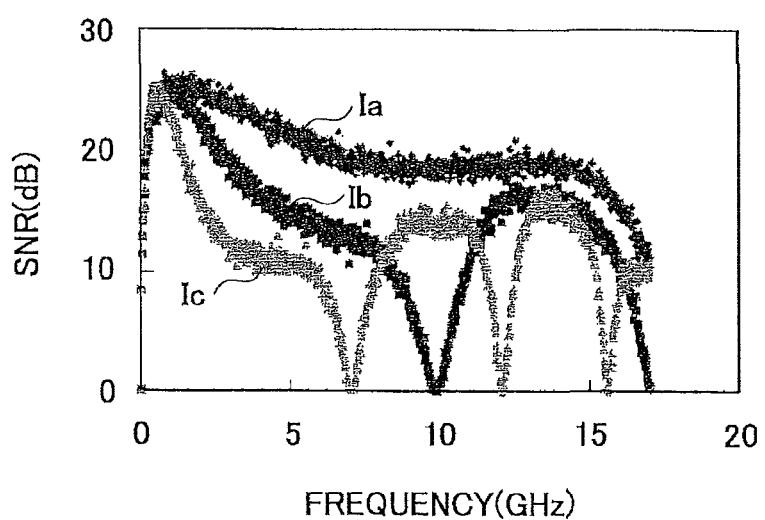
FIG. 2 is a schematic view illustrating frequency characteristics of ONUs.
Figure 3:
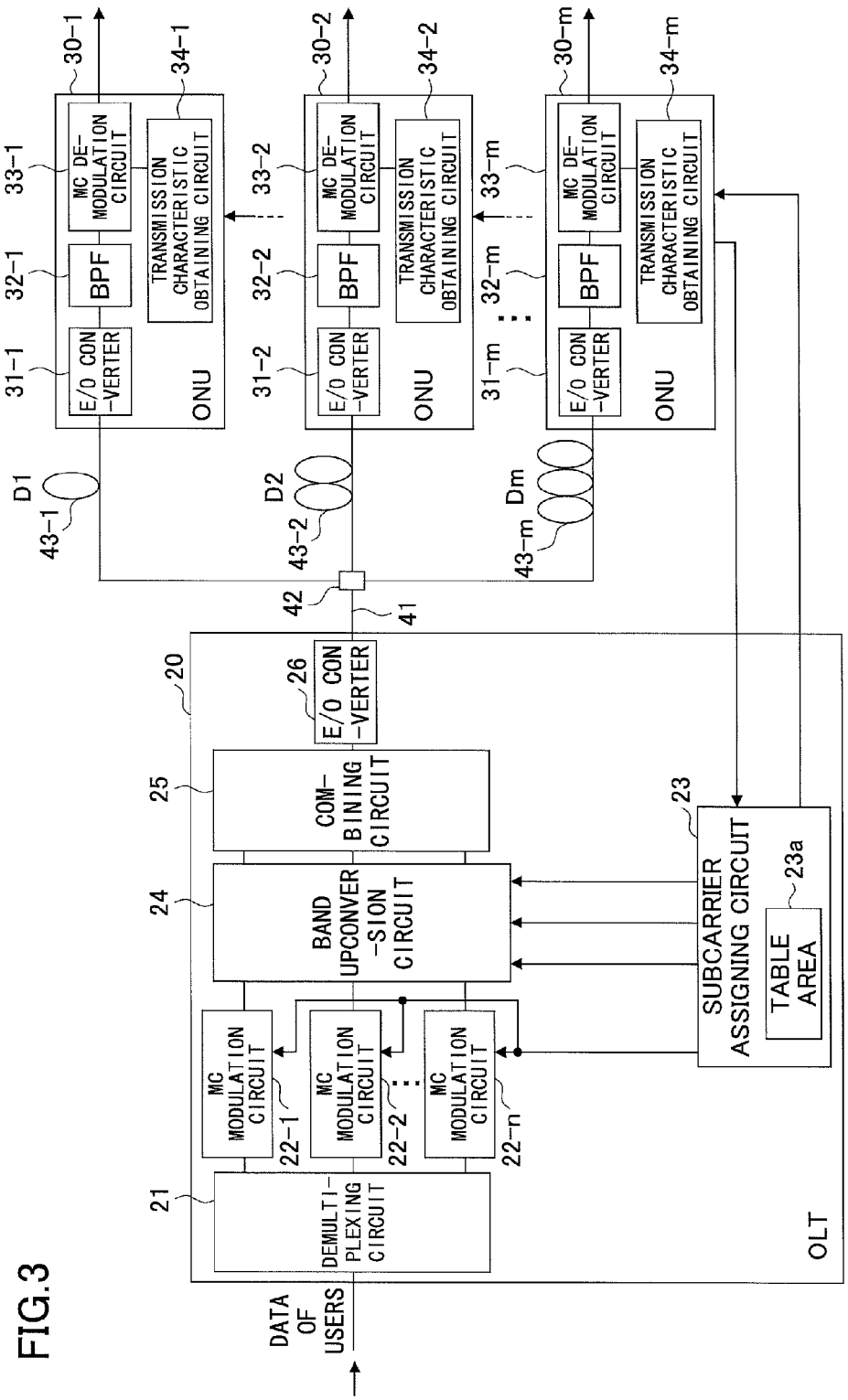
FIG. 3 is a configuration diagram of a PON system according to an embodiment.

<PON System>
FIG. 3 is a configuration diagram of a PON system according to the present embodiment. In FIG. 3, the PON system includes a station device OLT 20 and subscriber devices ONU 30-1, 30-2, ..., 30-m for users. The OLT 20 is connected with an optical splitter 42 by an optical fiber 41, and the optical splitter 42 is connected with the ONUs 30-1 to 30-m by optical fibers 43-1 to 43-m having different lengths of D1 to Dm, respectively.

A demultiplexing circuit 21 in the OLT 20 is supplied with transmitting data from the users. The transmitting data is, for example, time-division multiplexed. The demultiplexing circuit 21 separates the transmitting data for each of the users, which is supplied to multi-carrier signal modulation circuits (MC modulation circuits) 22-1 to 22-n. Each of the multi-carrier signal modulation circuits 22-1 to 22-n is indicated with a subcarrier assignment and a modulation scheme by a subcarrier assigning circuit 23.

Each of the multi-carrier signal modulation circuits 22-1 to 22-n includes a serial-parallel conversion section, a mapper section, an IFFT (Inverse Fast Fourier Transform) section, and a parallel-serial conversion section. The serial-parallel conversion section distributes the transmitting data to subcarriers. The mapper section modulates assigned subcarriers with data and the modulation scheme. A modulated signal output by the mapper section is converted into a time-domain signal by the IFFT section. The parallel-serial conversion section multiplexes modulated signals of the subcarriers to supply them to a band upconversion circuit 24.

The band upconversion circuit 24 is indicated with bands assigned for each of the users by the subcarrier assigning circuit 23, and upconverts one or multiple subcarriers supplied by the multi-carrier signal modulation circuit 22-1 to 22-n to the bands assigned for the users, and outputs the upconverted signals. The upconverted signals for the users are combined, namely, frequency multiplexed, by a combining circuit 25. A multi-carrier signal output by the combining circuit 25 is converted from an electrical signal into an optical signal by an E/O converter 26, to be transmitted into the optical fiber 41. The optical signal is split by the optical splitter 42 into m-ways, each of which is transmitted to one of the ONUs 30-1 to 30-m, with the different-length optical fibers 43-1 to 43-m, respectively.

The optical signals transmitted through the optical fibers 43-1 to 43-m are converted from optical signals into electrical signals by O/E converters 31-1 to 31-m in the ONUs 30-1 to 30-m, to be supplied to band-pass filters (BPFs) 32-1 to 32-m, respectively. The band-pass filters 32-1 to 32-m are indicated with passbands for the users by the subcarrier assigning circuit 23, to allow the signals in the indicated bands to pass, which are supplied to multi-carrier signal demodulation circuits (MC demodulation circuits) 33-1 to 33-m. The multi-carrier signal demodulation circuits 33-1 to 33-m are indicated with subcarrier assignments and demodulation schemes of the users by the subcarrier assigning circuit 23.

Each of the multi-carrier signal demodulation circuits 33-1 to 33-m includes a serial-parallel conversion section, an FFT (Fast Fourier Transform) section, a demapper section, and a parallel-serial conversion section. The serial-parallel conversion section dispatches received data to the subcarriers. The FFT section converts the time-domain data of the subcarriers into the frequency-domain data by Fourier transform. The demapper section demodulates a modulated signal according to an assigned subcarrier and a demodulation scheme to extract data. The parallel-serial conversion section multiplexes the demodulated signals of the subcarriers to supply them to succeeding circuits.

Upon a direction of the subcarrier assigning circuit 23, transmission characteristic obtaining circuits 34-1 to 34-m calculate for the subcarriers, for example, SNR (Signal to Noise Ratio) from the demodulated signals supplied by the multi-carrier signal demodulation circuit 33-1 to 33-m, obtain the SNR for all of the bands of n-channel subcarriers as transmission characteristics, and transmit the obtained transmission characteristics to the subcarrier assigning circuit 23.

Figure 4:
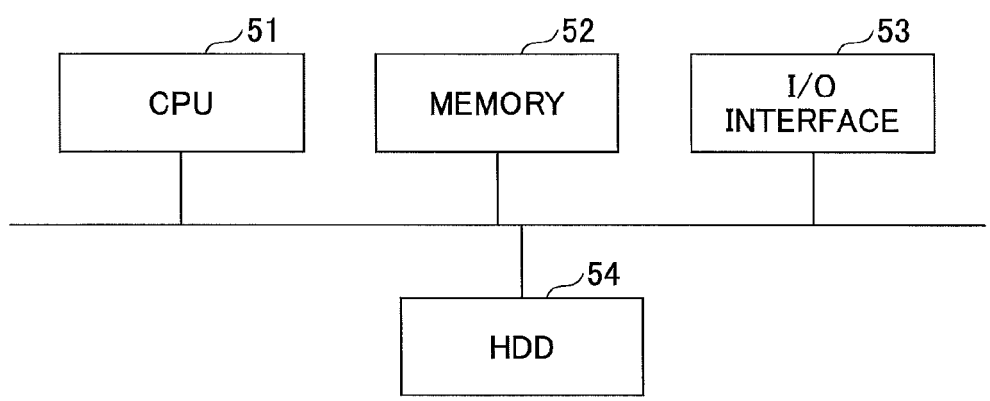
FIG. 4 is a hardware configuration diagram of a subcarrier assigning circuit according to an embodiment.

FIG. 4 is a hardware configuration diagram of the subcarrier assigning circuit 23 according to an embodiment. In FIG. 4, the subcarrier assigning circuit 23 includes a CPU 51, a memory 52, an input/output interface 53, and a hard disk drive 54. The CPU 51, the memory 52, the input/output interface 53, and the hard disk drive 54 are connected with each other by a bus. The CPU 51 executes various processing, which will be described later, by executing programs stored in the memory 52 or the hard disk drive 54. It is noted that the transmission characteristic obtaining circuits 34-1 to 34-m have substantially the same configuration as the one illustrated in FIG. 4.

Also, the input/output interface 53 transmits/receives signals between the multi-carrier signal modulation circuits 22-1 to 22-n, the band upconversion circuit 24, and the transmission characteristic obtaining circuits 34-1 to 34-m. The hard disk drive 54 provides a table area 23a that includes: a transmission characteristic table for storing transmission characteristics of the ONUs 30-1 to 30-m; a table of transmittable number of bits for storing the number of bits transmittable by subcarriers for the ONUs 30-1 to 30-m; a used band table for storing subcarrier numbers of bands used by the ONUs 30-1 to 30-m; and the like.

In the present embodiment, DMT (Discrete Multi Tone) modulation/demodulation scheme, which is one of multi-carrier modulation/demodulation schemes that uses multiple carriers with different frequencies, is used. It is not limited to this scheme, however, but OFDM (Orthogonal Frequency Division Multiplexing) modulation/demodulation scheme or the like may be used.

<Initial Adjustment>

Figure 5:
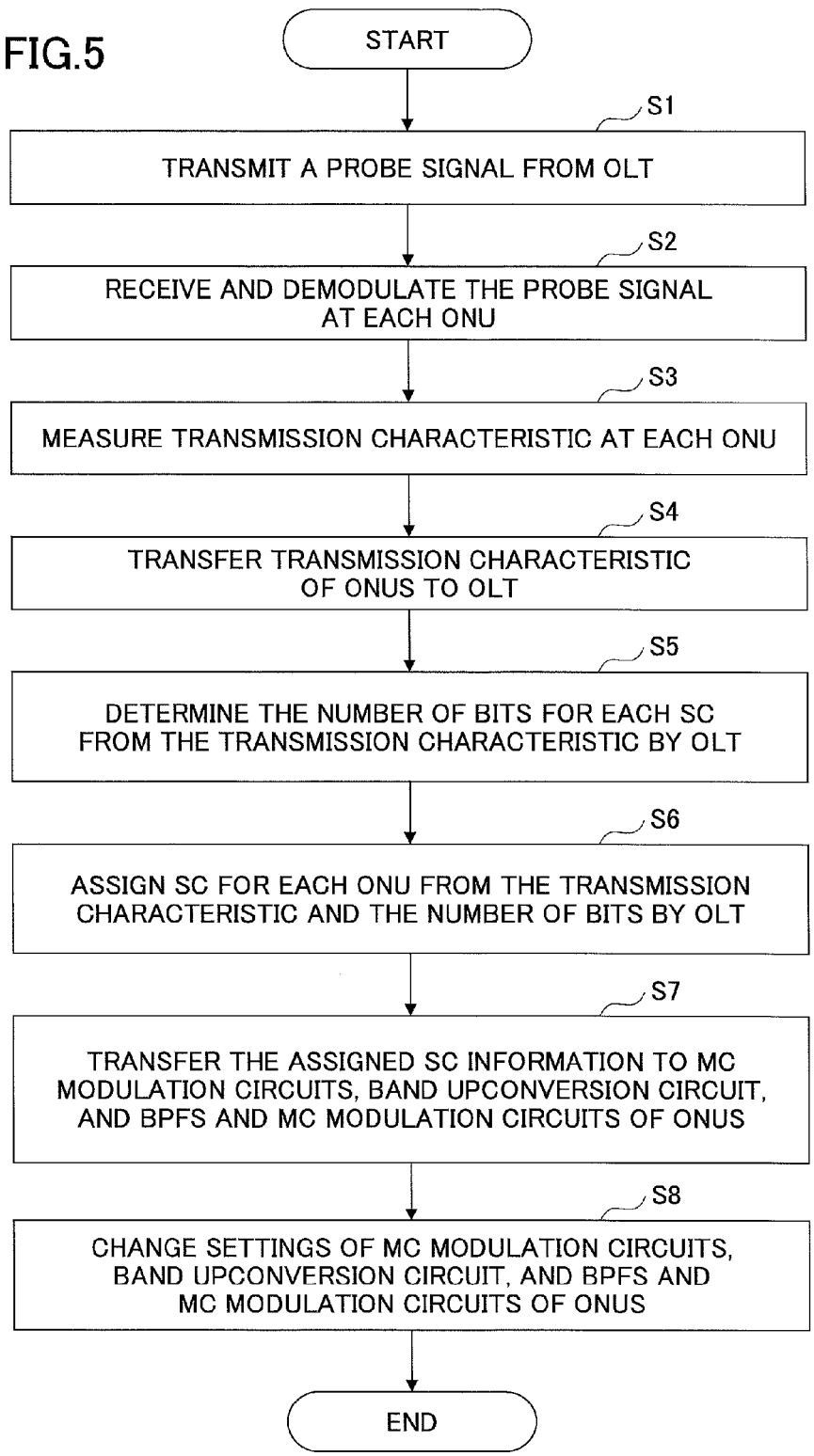
FIG. 5 is a flowchart for an initial adjustment process according to an embodiment.
Figure 6:
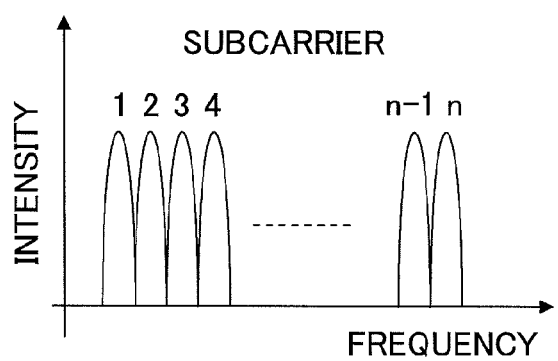
FIG. 6 is a schematic view illustrating n-channel subcarriers.

FIG. 5 is a flowchart for an initial adjustment process according to the present embodiment, which is executed by the subcarrier assigning circuit 23 when starting up a system. In FIG. 5, at Step S1, the subcarrier assigning circuit directs the multi-carrier signal modulation circuits 22-1 to 22-n to execute, for example, QPSK (Quadrature Phase-Shift Keying) modulation for all the bands of the n-channel subcarriers, to generate QPSK modulated probe signals for the n-channel subcarriers. The OLT 20, then, transmits a test optical signal, which is generated by combining the probe signal and applying electric-optic conversion to the signal, into the optical fiber 41. Here, FIG. 6 is a schematic view illustrating all the bands of the n-channel subcarriers.

Figure 7:
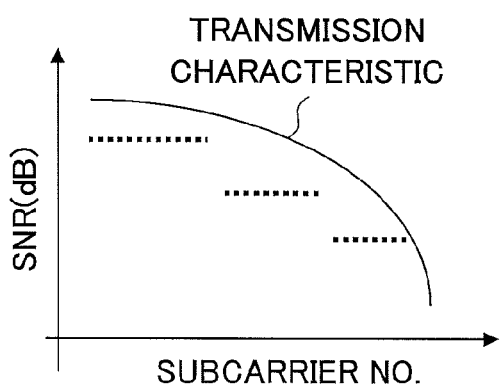
FIG. 7 is a schematic view illustrating a transmission characteristic of a subcarrier.

At Step S2, each of the ONUS 30-1 to 30-m receives the test optical signal, applies photoelectric conversion to the signal, and executes QPSK demodulation to all the bands of the n-channel subcarriers. Next, at Step S3, each of the ONUS 30-1 to 30-m measures a transmission characteristic for all the bands of the n-channel subcarriers as illustrated in FIG. 7, then, at Step S4, transmits the transmission characteristic to the subcarrier assigning circuit 23 of the OLT 20. Here, the transmission characteristic is represented by SNR for each of the n-channel subcarriers.

Figure 8A:
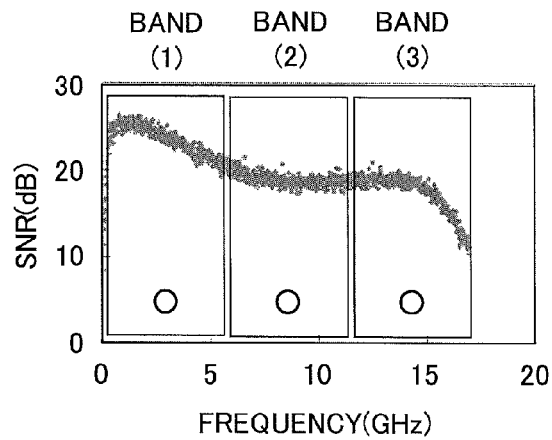
FIGS. 8A-8C are schematic views illustrating transmission characteristics of ONUs.

FIG. 8A is a schematic view illustrating a transmission characteristic of the ONU 30-1 using a short optical fiber 43-1. In this case, a satisfactory transmission characteristic is obtained for all bands including a band (1) with a low frequency, a band (2) with an intermediate frequency, and a band (3) with a high frequency, as designated by circles in FIG. 8A.

Figure 8B:
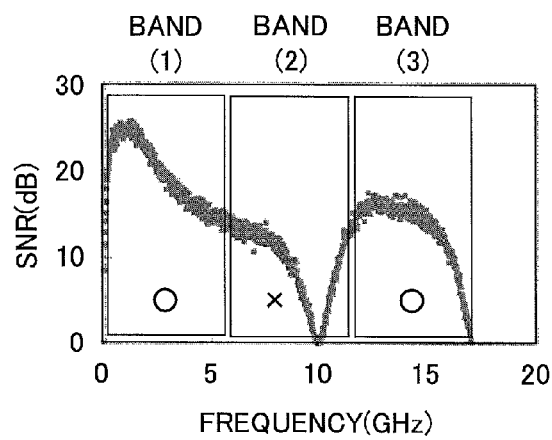
Figure 8C:
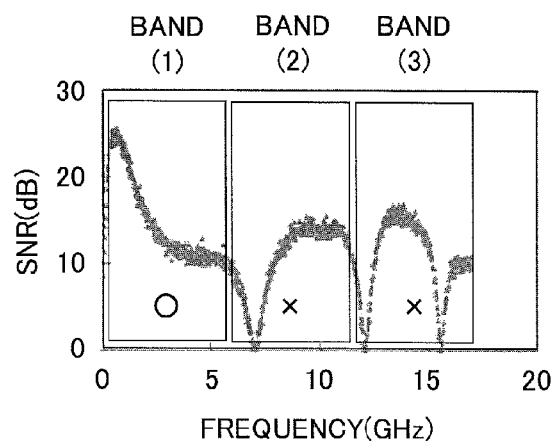

Also, FIG. 8B is a schematic view illustrating a transmission characteristic of the ONU 30-2 using an intermediate-length optical fiber 43-2. In this case, a satisfactory transmission characteristic is obtained for the low band (1) and the high band (3). Also, FIG. 8C is a schematic view illustrating a transmission characteristic of the ONU 30-m using a long optical fiber 43-m. In this case, a satisfactory transmission characteristic is obtained only for the low band (1).

At Step S5, the subcarrier assigning circuit 23 determines the number of bits transmittable/receivable by each subcarrier for the ONU 30-1 from the transmission characteristic at the ONU 30-1. Similarly, the OLT 20 determines the number of bits transmittable/receivable by each subcarrier for the ONU 30-2 to 30-m from the transmission characteristic of the ONU 30-2 to 30-m. In FIG. 7, the number at transmittable/receivable bits by a subcarrier is designated by dots. Here, the vertical axis represents the number of bits.

FIG. 9A is a schematic view illustrating an example of a table of transmittable number of bits, bij, for each of n-channel subcarriers (SCs) for the ONUS 30-1 to 30-m. Here, i (an integer between 1 and m) is a number for specifying one of the ONU1 to ONUm, and j (an integer between 1 and n) is a number for specifying one of the SC1 to SCn.

Here, it is determined, for example, that three bits can be transmitted/received with a modulation scheme of 8PSK (eight Phase-Shift Keying) if SNR of the j-th subcarrier is greater than a predetermined first threshold value. Also, it is determined that two bits can be transmitted/received with a modulation scheme of QPSK if SNR of the j-th subcarrier is smaller than the first threshold value and greater than a second threshold value (the first threshold value>the second threshold value). Further, it is determined that one bit can be transmit/received with a modulation scheme of BPSK (Binary Phase-Shift Keying) if SNR of the j-th subcarrier is smaller than the second threshold value and greater than a third threshold value (the second threshold value>the third threshold value). Here, it is not limited to phase modulation, but amplitude-shift keying or quadrature amplitude modulation may be used.

Next, at Step S6, the subcarrier assigning circuit 23 assigns subcarriers for the ONUs 30-1 to 30-m from the number of bits transmittable/receivable by the corresponding subcarriers obtained with the transmission characteristic and the number of bits required for transmission at each of the ONUs 30-1 to 30-m.

Here, subcarrier assignments for the transmittable/receivable bits bm(n−1) and bmn are determined if the total number of bm(n−1) and bmn is greater than or equal to the number of bits required for the ONUm, which are surrounded by single-dot chain lines in FIG. 9A, and the total number of bits of not-assigned subcarriers SC1 to SC (n−2) takes the maximum value, which are surrounded by two-dot chain lines.

After that, subcarrier assignments for the transmittable/receivable bits b22 and b23 are determined if the total number of b22 and b23 is greater than or equal to the number of bits required for the ONU2, which are surrounded by single-dot chain lines in FIG. 9B, and the total number of bits of not-assigned subcarriers SC1 and SC4 to SC(n−2) takes the maximum value, which are surrounded by two-dot chain lines.

Further, subcarrier assignment for the transmittable/receivable bits b11 is determined if the total number of b11 is greater than or equal to the number of bits required for the ONU1, which is surrounded by single-dot chain lines in FIG. 9C, and the total number of bits of not-assigned subcarriers SC4 to SC(n−2) takes the maximum value, which are surrounded by two-dot chain lines.

Here, in the example above, the ONU1 to ONUm are arranged, for example, in an ascending order with respect to the length of optical fibers in FIGS. 9A-9C. It is often the case that a satisfactory transmission characteristic is obtained for a wider band with a shorter optical fiber, hence an ONU that has a satisfactory transmission characteristic only within a narrow band is prioritized for subcarrier assignment.

Next, at Step S7, the subcarrier assigning circuit 23 transfers information about the determined subcarrier assignments to the multi-carrier signal modulation circuits 22-1 to 22-n, the band upconversion circuit 24, and the band-pass filters 32-1 to 32-m and the multi-carrier signal demodulation circuits 33-1 to 33-m of the ONUs.

In response to the information transferred by the subcarrier assigning circuit 23, at Step S8, the multi-carrier signal modulation circuits 22-1 to 22-n, the band upconversion circuit 24, and the band-pass filters 32-1 to 32-m and the multi-carrier signal demodulation circuits 33-1 to 33-m of the ONUS change their settings.

<During Operation>

Figure 10:
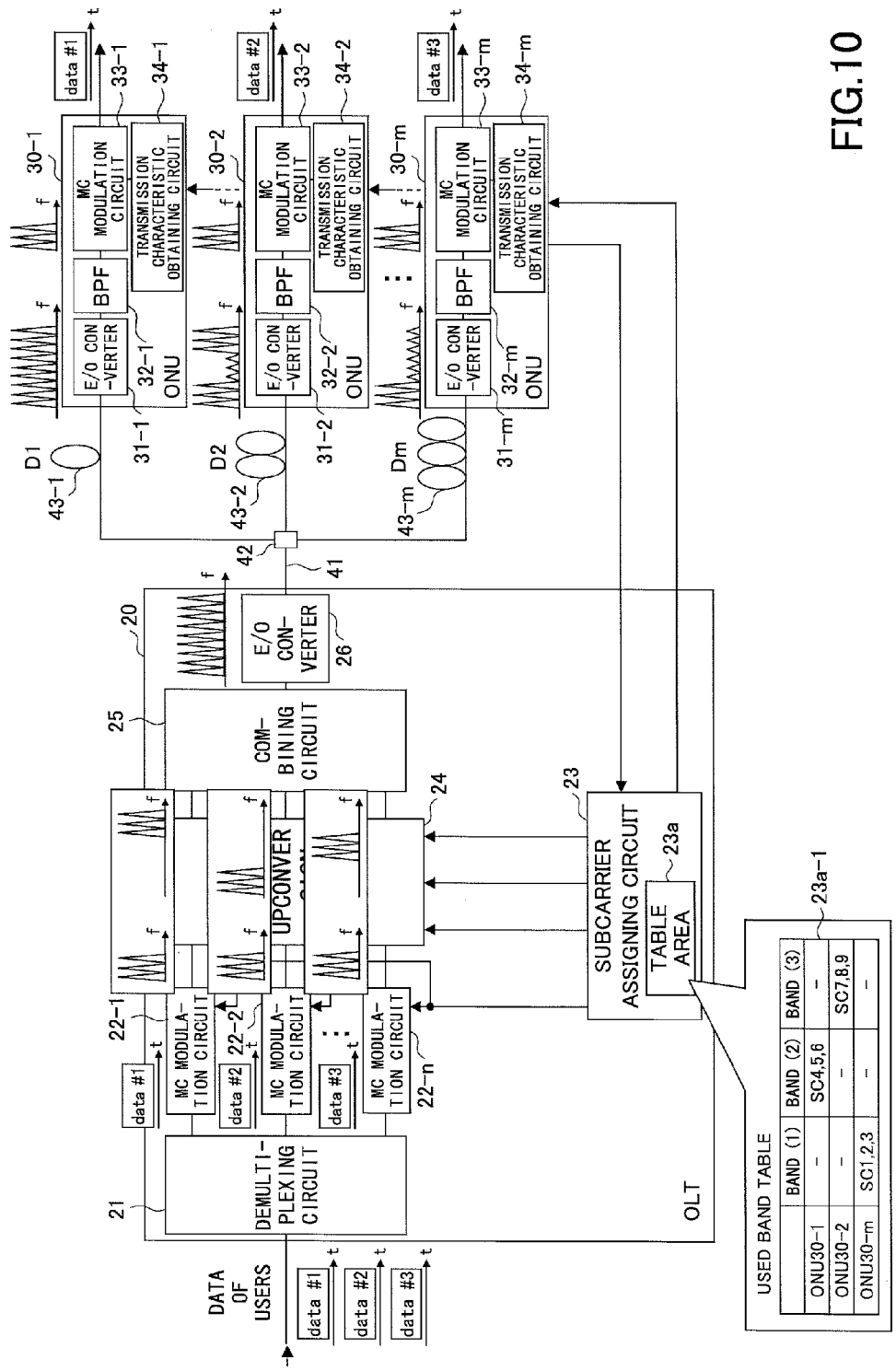
FIG. 10 is a schematic view illustrating behavior of sections during operation.

If the transmission characteristics illustrated in FIGS. 8A-8C are obtained as a result of the initial adjustment, the ONU 30-m is assigned with subcarriers SC1, SC2, and SC3 in the band (1), as illustrated in a used band table 23a-1 in the table area 23a of the subcarrier assigning circuit 23 in FIG. 10. Also, the ONU 30-2 is assigned with subcarriers SC7, SC8, and SC9 in the band (3), and the ONU 30-1 is assigned with subcarriers SC4, SC5, and SC6 in the band (2).

In FIG. 10, the subcarrier assigning circuit 23 issues a direction for operation control for the multi-carrier signal modulation circuits 22-1 to 22-n, the band upconversion circuit 24, and the ONUS 30-1 to 30-m, based on a content of the used band table 23a-1. With this direction, user data #1, data #2, and data #3 are separated by the demultiplexing circuit 21 to be supplied to the multi-carrier signal modulation circuits 22-1, 22-2, and 22-n. The multi-carrier signal modulation circuit 22-1 digitally modulates three subcarriers SC1, SC2, and SC3 with the data #1. Also, the multi-carrier signal modulation circuit 22-2 digitally modulates three subcarriers SC7, SC8, and SC9 with the data #2 and the multi-carrier signal modulation circuit 22-n digitally modulates three subcarriers SC4, SC5, and SC6 with the data #3.

Also, the band upconversion circuit 24 upconverts the three modulated subcarriers supplied by the multi-carrier signal modulation circuit 22-1 into the band (2) for subcarriers SC4, SC5, and SC6. Similarly, the band upconversion circuit 24 upconverts the three modulated subcarriers supplied by the multi-carrier signal modulation circuit 22-2 into the band (3) for subcarriers SC7, SC8, and SC9. Also, the band upconversion circuit 24 upconverts the three modulated subcarriers supplied by the multi-carrier signal modulation circuit 22-n into the band (1) for subcarriers SC1, SC2, and SC3.

Next, the upconverted signals for the users are combined, or frequency-multiplexed, by the combining circuit 25. A multi-carrier signal output by the combining circuit 25 is converted from an electrical signal to an optical signal by the E/O converter 26 to be transmitted to the optical fiber 41.

The ONU 30-1 is supplied with a multi-carrier signal having a satisfactory transmission characteristic in all the bands from the optical fiber 43-1, the ONU 30-2 is supplied with a multi-carrier signal having a satisfactory transmission characteristic in the low band (1) and the high band (3) from the optical fiber 43-2, and the ONU 30-m is supplied with a multi-carrier signal having a satisfactory transmission characteristic only in the low band (1) from the optical fiber 43-m.

The band-pass filter 32-1 of the ONU 30-1 allows the band (2) to pass, and the multi-carrier signal demodulation circuit 33-1 demodulates the data #1 from the modulated subcarriers SC4, SC5, and SC6 for the band (2), to output the demodulated data. Also, the band-pass filter 32-2 of the ONU 30-2 allows the band (3) to pass, and the multi-carrier signal demodulation circuit 33-2 demodulates the data #2 from the modulated subcarriers SC7, SC8, and SC9 for the band (3), to output the demodulated data. Also, the band-pass filter 32-m of the ONU 30-m allows the band (1) to pass, and the multi-carrier signal demodulation circuit 33-m demodulates the data #3 from the modulated subcarriers SC1, SC2, and SC3 for the band (1), to output the demodulated data.

Thus, all of the bands (1), (2), and (3) can be used effectively to improve spectral efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A PON (Passive Optical Network) system modulating a plurality of subcarriers with data of a plurality of users to output an optical multiplexed signal from a station device, splitting the optical multiplexed signal to transmit the split signals to a plurality of subscriber devices, each of the plurality of subscriber devices being provided for one of the plurality of users, and demodulating the data of the plurality of users at the plurality of subscriber devices, respectively, the PON system comprising:

an obtaining section configured to obtain a transmission characteristic for each of the plurality of subcarriers at each of the plurality of subscriber devices, by receiving a test signal at the plurality of subscriber devices, the test signal being transmitted from the station device; and an assigning section configured to assign one or more of the plurality of subcarriers for each of the plurality of subscriber devices suited to the transmission characteristics of the assigned subcarriers at the plurality of subscriber devices, wherein the station device includes
      a plurality of inverse Fourier transform circuits configured to digitally modulate one or more of the plurality of subcarriers with the data of one of the plurality of users, the one or more of the plurality of subcarriers being assigned to the one of the plurality of users by the assigning section,
      a frequency conversion circuit configured to convert a frequency of the one or more modulated subcarriers assigned to the one of the plurality of users into a band assigned to the one of the plurality of users, the one or more modulated subcarriers being output by the plurality of inverse Fourier transform circuits, and
      an electric-optic conversion circuit configured to combine the modulated subcarriers output by the frequency conversion circuit, and to apply an electric-optic conversion to the combined signal to be output as the optical multiplexed signal.

2. The PON system as claimed in claim 1, wherein each of the plurality of subscriber devices provided for one of the plurality of users includes
   a photoelectric conversion circuit configured to convert the optical multiplexed signal into an electric signal,
   a band-pass filter circuit configured to be supplied with the electric signal converted by the photoelectric conversion circuit for allowing the band assigned to the one of the plurality of users to pass, and
   a Fourier transform circuit configured to digitally demodulate the data of the one of the plurality of users from the one or more of the plurality of subcarriers assigned to the one of the plurality of users by the assigning section.

3. The PON system as claimed in claim 2, wherein the obtaining section obtains an SN (Signal to Noise) ratio of a demodulated signal of one of the plurality of subcarriers as the transmission characteristic of the one of the plurality of subcarriers.

4. The PON system as claimed in claim 2, wherein the assigning section
   determines a number of bits transmittable by one of the plurality of subcarriers at each of the plurality of subscriber devices from the transmission characteristic of the one of the subcarriers at each of the plurality of subscriber devices, then upon the determination,
   assigns one or more of the subcarriers to each one of the plurality of subscriber devices so that a total number of bits transmittable by the one or more of the subcarriers is greater than or equal to the number of bits required for the each one of the plurality of subscriber devices.

5. A method of assigning a plurality of subcarriers in a PON (Passive Optical Network) system modulating the plurality of subcarriers with data of a plurality of users to output an optical multiplexed signal from a station device, splitting the optical multiplexed signal to transmit the split signals to a plurality of subscriber devices, each of the plurality of subscriber devices being provided for one of the plurality of users, and demodulating the data of the plurality of users at the plurality of subscriber devices, respectively, the method comprising:
   obtaining a transmission characteristic for each of the plurality of subcarriers at each of the plurality of subscriber devices, by receiving a test signal at the plurality of subscriber devices, the test signal being transmitted from the station device; and
   assigning one or more of the plurality of subcarriers for each of the plurality of subscriber devices suited to the transmission characteristics of the assigned subcarriers at each of the plurality of subscriber devices,
   wherein the station device
      digitally modulates one or more of the plurality of subcarriers with the data of one of the plurality of users, the one or more of the plurality of subcarriers being assigned to the one of the plurality of users,
      converts a frequency of the one or more modulated subcarriers assigned to the one of the plurality of users into a band assigned to the one of the plurality of users, and
      combines the frequency-converted and modulated subcarriers, and then applies an electric-optic conversion to the combined signal to be output as the optical multiplexed signal.

6. The method as claimed in claim 5, wherein each of the plurality of subscriber devices provided for one of the plurality of users
   converts the optical multiplexed signal into an electric signal,
   allows the band assigned to the one of the plurality of users to pass for the electric signal converted from the optical multiplexed signal, and
   digitally demodulates the data of the one of the plurality of users from the one or more of the plurality of subcarriers assigned to the one of the plurality of users by the assigning section.

7. The method as claimed in claim 6, wherein the obtaining further obtains an SN (Signal to Noise) ratio of a demodulated signal of one of the plurality of subcarriers as the transmission characteristic of the one of the plurality of subcarriers.

8. The method of as claimed in claim 6, wherein the assigning further determines a number of bits transmittable by one of the plurality of subcarriers at each of the plurality of subscriber devices from the transmission characteristic of the one of the subcarriers at each of the plurality of subscriber devices, then upon the determination,
assigns one or more of the subcarriers to each one of the plurality of subscriber devices so that a total number of bits transmittable by the one or more of the subcarriers is greater than or equal to the number of bits required for the each one of the plurality of subscriber devices.

\* \* \* \* \*